(12) United States Patent
Park et al.

(10) Patent No.: US 9,258,239 B2
(45) Date of Patent: *Feb. 9, 2016

(54) METHOD FOR MANAGING AND SHARING SYMMETRIC FLOW AND ASYMMETRIC FLOW IN DUPLEXED NETWORK

(71) Applicant: ELECTRONICS AND TELECOMMUNICATIONS RESEARCH INSTITUTE, Daejeon (KR)

(72) Inventors: Sang Kil Park, Daejeon (KR); Joon Kyung Lee, Daejeon (KR); Dong Won Kang, Daejeon (KR); Sang Wan Kim, Daejeon (KR); Wang Bong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 106 days.

This patent is subject to a terminal disclaimer.

(21) Appl. No.: 14/060,508

(22) Filed: Oct. 22, 2013

(65) Prior Publication Data

US 2014/0112136 A1    Apr. 24, 2014

(30) Foreign Application Priority Data

Oct. 22, 2012 (KR) .......... 10-2012-0117236
Jun. 24, 2013 (KR) .......... 10-2013-0072073
Oct. 22, 2013 (KR) .......... 10-2013-0125692

(51) Int. Cl.
*H04L 12/803* (2013.01)
*H04L 5/14* (2006.01)
*H04L 12/707* (2013.01)

(52) U.S. Cl.
CPC .............. *H04L 47/125* (2013.01); *H04L 5/14* (2013.01); *H04L 45/24* (2013.01)

(58) Field of Classification Search
CPC ....................................................... H04L 47/125
See application file for complete search history.

(56) References Cited

U.S. PATENT DOCUMENTS

| 6,314,465 B1* | 11/2001 | Paul et al. ..................... 709/226 |
| 2008/0130497 A1 | 6/2008 | Sang Wan et al. |
| 2011/0255537 A1* | 10/2011 | Ramasamy et al. .......... 370/392 |
| 2012/0213074 A1 | 8/2012 | Goldfarb et al. |
| 2014/0112212 A1* | 4/2014 | Lee et al. ..................... 370/276 |

FOREIGN PATENT DOCUMENTS

| KR | 10-2008-0050263 A | 6/2008 |
| KR | 10-2008-0087197 | 10/2008 |
| KR | 10-2012-0032267 | 4/2012 |

OTHER PUBLICATIONS

Lebin Cheng et al., "Constructing high-performance firewall load-balancing clusters: practical experience and novel ideas", Proceedings of SPIE Technologies, Protocols, and Services for Next-Generation Internet, Jul. 26, 2001, pp. 134-141, vol. 4527, Denver, USA.

* cited by examiner

*Primary Examiner* — Albert T Chou

(57) ABSTRACT

Provided is a network duplexing apparatus and method. The network duplexing apparatus includes a plurality of network interface units configured to store information of a flow flowing in the network interface units, provide the information of the flow to a master unit when the flow corresponds to an asymmetric flow, and request information of an opposite side flow of the flow from the master unit to receive the requested information, and the master unit configured to store the information of the flow provided from the network interface unit, determine whether the information of the opposite side flow of the flow is stored, and provide the information of the opposite side flow to the network interface unit when the information of the opposite side flow is stored.

18 Claims, 7 Drawing Sheets

METHOD FOR MANAGING AND SHARING SYMMETRIC FLOW AND ASYMMETRIC FLOW IN DUPLEXED NETWORK

CLAIM FOR PRIORITY

This application claims priority to Korean Patent Application No. 10-2012-0117236, filed on Oct. 22, 2012, No. 10-2013-0072073 filed on Jun. 24, 2013, and No. 10-2013-0125692 filed on Oct. 22, 2013 in the Korean Intellectual Property Office (KIPO), the entire contents of which are hereby incorporated by reference.

BACKGROUND

1. Technical Field

Example embodiments of the present invention relate in general to network duplexing, and more specifically to a method and apparatus which enable integrated management and analysis of flow information with respect to an asymmetric flow configured in such a manner that a packet outflow passage from a network duplexing apparatus is different from a packet inflow passage to the network duplexing apparatus.

2. Related Art

When network duplexing is applied in a point of presence (PoP) of a communication company or an enterprise network, at least two inflow passages or outflow passages of traffic may be configured. In this case, traffic which occurs in each of an access path from a remote location and a node (terminal) corresponding to a management network may use different paths from each other.

In this manner, when a flow of traffic which is generated from a remote location to be transmitted toward a terminal and a flow of traffic which is generated in the terminal to be transmitted toward the remote location use different paths from each other in the network duplexing apparatus, such a flow may be defined as an asymmetric flow. On the other hand, when a flow of traffic which is generated from a remote location to be transmitted toward a terminal and a flow of traffic which is generated in the terminal to be transmitted toward the remote location use the same path in the network duplexing apparatus, such a flow may be defined as a symmetric flow.

In this case, since flows constituting the asymmetric flow are managed in mutually different network interface units, consistent management for the flows is difficult, and therefore service providing or consistent management for quality of service (QoS) in a network duplexing environment is made difficult.

Thus, when a consistent information management method for such an asymmetric flow is provided in a duplexed network having a plurality of interfaces, one step advanced response such as service providing or QoS may be possible.

When a network service provider, a manager of an enterprise network, or a Telco operator presents an ability to analyze packets which flow in all interfaces under the same condition, various functions such as scalability, auto-load balancing, additional capacity, flexible deployment, and the like may be provided.

SUMMARY

Accordingly, example embodiments of the present invention are provided to substantially obviate one or more problems due to limitations and disadvantages of the related art.

Example embodiments of the present invention provide a network duplexing apparatus which enables integrated analysis and management with respect to an asymmetric flow in which a packet inflow passage and a packet outflow passage are different from each other.

Example embodiments of the present invention also provide a network duplexing method which enables integrated analysis and management with respect to an asymmetric flow in which a packet inflow passage and a packet outflow passage are different from each other.

In some example embodiments, a network duplexing apparatus includes: a plurality of network interface units configured to store information of a flow flowing in the network interface units when the information of the flow is not generated, provide the information of the flow to a master unit when the flow corresponds to an asymmetric flow, and request information of an opposite side flow of the flow from the master unit to receive the requested information; and the master unit configured to store the information of the flow provided from the network interface unit, determine whether the information of the opposite side flow of the flow is stored, and provide the information of the opposite side flow to the network interface unit when the information of the opposite side flow is stored, wherein the plurality of network interface units are network interface cards mounted in each corresponding slot of a board, and the master unit comprises a central processing unit (CPU).

Here, the network duplexing apparatus may be operated based on a connection-oriented protocol.

Also, when information of a flow including an SYN packet corresponding to an SYN-ACK packet is not stored in the network interface unit in a case in which the SYN-ACK packet flows in, the network interface unit may recognize that the flow corresponds to the asymmetric flow.

Also, when information of a flow including an SYN-ACK packet is not stored in the network interface unit in a case in which an ACK packet with respect to the SYN-ACK packet flows in, the network interface unit may recognize that the flow corresponds to the asymmetric flow.

Here, the network duplexing apparatus may be operated based on a connectionless-oriented protocol.

Also, when the opposite side flow of the flow does not flow in the network interface unit for a prescribed period, the network interface unit may recognize that the flow corresponds to the asymmetric flow.

Also, the network interface unit may provide traffic information of flows corresponding to the asymmetric flow to the master unit at a traffic processing point of time of the flows corresponding to the asymmetric flow or at predetermined intervals.

Also, the master unit may store the traffic information of the flows corresponding to the asymmetric flow provided from the network interface unit.

Also, the network interface unit may include a control interface unit configured to perform interfacing with the master unit, a network interface unit configured to transmit and receive the flow to and from the outside, a local flow header table storage unit configured to store information about flows processed in the network interface unit, a traffic information storage unit configured to store traffic information of the flows, and a control unit configured to analyze a packet flowing in through the network interface unit, generate information of a flow corresponding to the packet when the information of the flow corresponding to the packet is not generated, store the generated information in the local flow header table storage unit, provide the information of the flow to the master unit through the control interface unit when the flow corresponds to the asymmetric flow, request the information of the opposite side flow of the flow from the master unit to receive the requested information, and store the traffic information of the flow in the traffic information storage unit.

Also, the master unit may include a control interface unit configured to perform interfacing with the network interface unit, an asymmetric flow header table storage unit configured to store the information of the asymmetric flow received from the network interface unit, a traffic information storage unit configured to store traffic information of the asymmetric flows, and a central processing unit (CPU) configured to determine whether the information of the opposite side flow of the flow is stored with reference to the information of the asymmetric flow received from the network interface unit through the control interface unit, provide the information of the opposite side flow to the network interface unit when the information of the opposite side flow is stored, and store the information of the flow.

In other example embodiments, a network duplexing method as an operation method of a network duplexing apparatus including a master unit and a plurality of network interface units, the network duplexing method includes: analyzing, by the network interface unit, a flow flowing in the network interface unit; storing, by the network interface unit, information of the flow when information of the flow is not generated; determining, by the network interface unit, whether the flow corresponds to an asymmetric flow, providing the information of the flow to the master unit when the flow corresponds to the asymmetric flow, and requesting information of an opposite side flow of the flow from the master unit to receive the requested information; storing, by the master unit, the information of the flow provided from the network interface unit; and determining, by the master unit, whether the information of the opposite side flow of the flow is stored, and providing the information of the opposite side flow to the network interface unit when the information of the opposite side flow is stored, wherein the plurality of network interface units are network interface cards mounted in each corresponding slot of a board, and the master unit comprises a central processing unit (CPU).

Here, the flow may be a flow in accordance with a connection-oriented protocol.

Also, when information of a flow including an SYN packet corresponding to an SYN-ACK packet is not stored in the network interface unit in a case in which the SYN-ACK packet flows in, the network interface unit may recognize that the flow corresponds to the asymmetric flow.

Also, when information of a flow including an SYN-ACK packet is not stored in the network interface unit in a case in which an ACK packet with respect to the SYN-ACK packet flows in, the network interface unit may recognize that the flow corresponds to the asymmetric flow.

Also, the flow may be a flow in accordance with a connectionless-oriented protocol.

Also, when the opposite side flow of the flow does not flow in the network interface unit for a prescribed period, the network interface unit may recognize that the flow corresponds to the asymmetric flow.

Also, the network duplexing method may further include providing, by the network interface unit, traffic information of flows corresponding to the asymmetric flow to the master unit at a traffic processing point of time of the flows corresponding to the asymmetric flow or at predetermined intervals.

Also, the network duplexing method may further include storing, by the master unit, the traffic information of the flows corresponding to the asymmetric flow provided from the network interface unit.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternative forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The terminology used herein to describe embodiments of the invention is not intended to limit the scope of the invention. The articles "a," "an," and "the" are singular in that they have a single referent; however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

Figure 1:
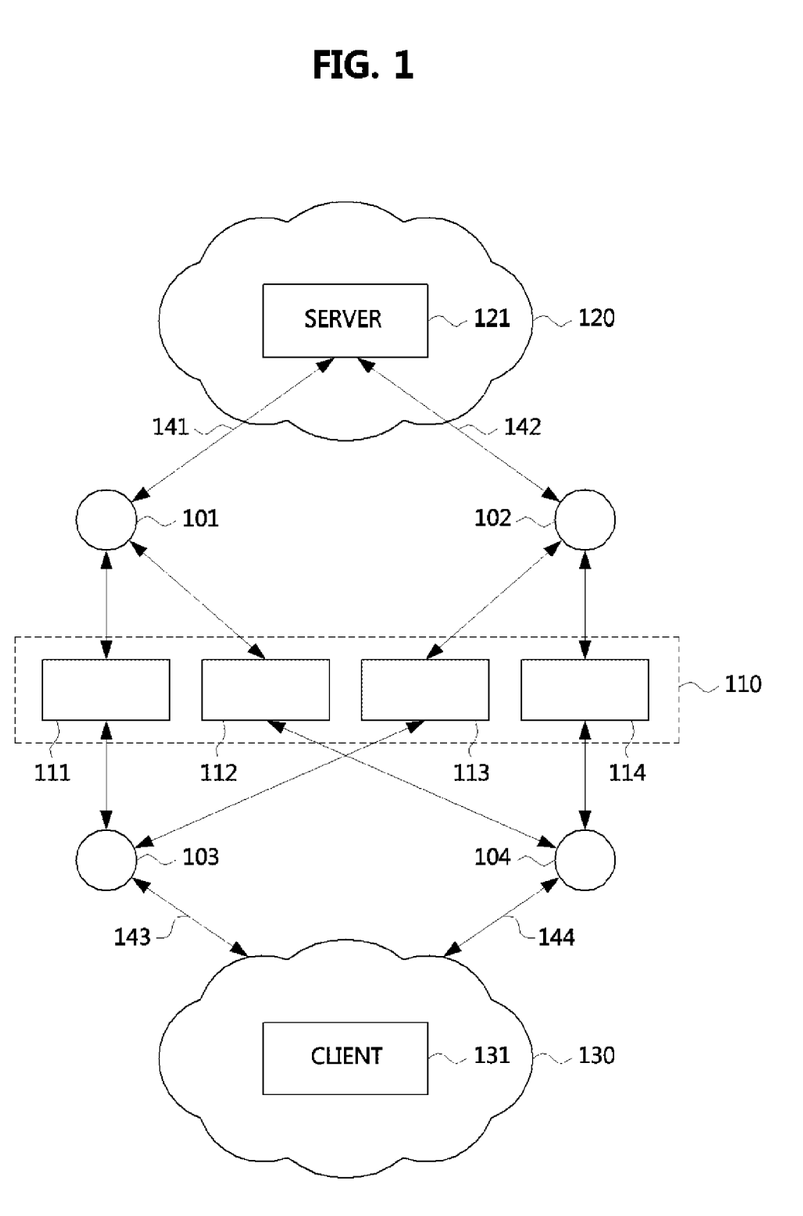
FIG. 1 is a conceptual diagram illustrating a concept of a network duplexing apparatus according to an embodiment of the present invention.

FIG. 1 is a conceptual diagram illustrating a concept of a network duplexing apparatus according to an embodiment of the present invention.

Referring to FIG. 1, a network duplexing apparatus 110 provides services to packets which flow in and out through four nodes 101, 102, 103, and 104. In this instance, the nodes 101 and 102 may be connected to an IP backbone network 120, and the nodes 103 and 104 may be connected to a subscriber access network 130. In addition, in the following descriptions, it is assumed that a server 121 is located in the IP backbone network and a client 131 is located in the subscriber access network.

Interfaces 111, 112, 113, and 114 between the respective nodes 101, 102, 103, and 104 may include several strands of 1 Gb lines or 10 Gb lines, and correspond to a network interface controller (NIC). That is, a network interface unit of the network duplexing apparatus according to an embodiment of the present invention which will be described later corresponds to the network interface controller which is responsible for the interface between the respective nodes.

Traffic which flows into the node 101 from the server 121 through an Internet line connected through a link 141 is transmitted to the client 131 using the node 103 or the node 104 in which the corresponding client 131 is positioned.

When the traffic of the client 131 flows into the node 103 through a connected line of a link 143, traffic from the client is transmitted to the server 121 through the node 101 or the node 102 by a network having a session recognition function and a function such as load balancing in accordance with a network state of processing equipment.

That is, when the traffic transmitted from the server 121 to the client 131 flows into the node 101 to be transmitted through the node 103, traffic transmitted from the client to the server may flow into the node 103 to be transmitted to the server 121 through the node 101 or the node 102.

When the traffic transmitted from the client to the server flows into the node 103 from the client to be transmitted to the server through the node 101 (that is, when the traffic from the client to the server and the traffic from the server to the client use the same path), a flow from the client to the server and a flow from the server to the client may be defined as a symmetric flow.

On the other hand, when the traffic transmitted from the client to the server flows into the node 103 from the client to be transmitted to the server through the node 102, the flow from the client to the server and the flow from the server to the client may be defined as an asymmetric flow.

The network duplexing apparatus according to an embodiment of the present invention may integrally manage information about the asymmetric flow and traffic information of the asymmetric flow in such a duplexed network structure.

This may enable a network service provider, a manager of an enterprise network, and a Telco operator to integrally manage flow information about the asymmetric flow and traffic information of a flow, and therefore packets which flow in all interfaces may be analyzed under the same condition.

Configuration of Network Duplexing Apparatus for Asymmetric Flow Management

Figure 2:
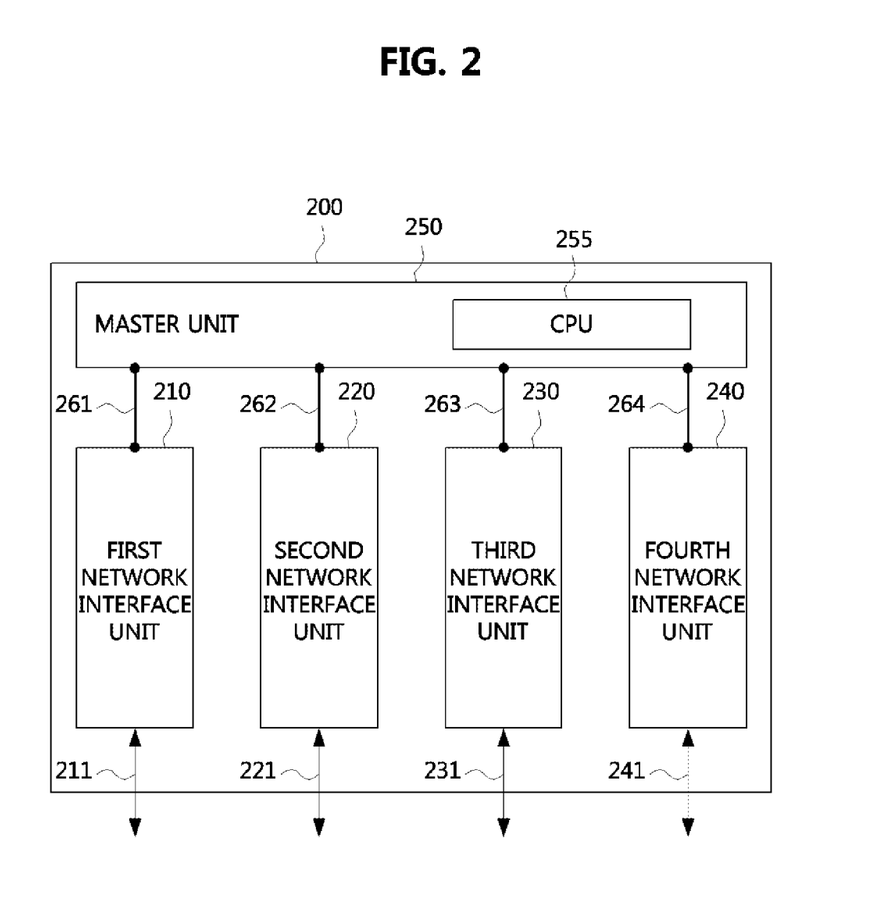
FIG. 2 is a block diagram illustrating a configuration of a network duplexing apparatus according to an embodiment of the present invention.

FIG. 2 is a block diagram illustrating a configuration of a network duplexing apparatus according to an embodiment of the present invention.

Referring to FIG. 2, a network duplexing apparatus 200 according to an embodiment of the present invention may include a plurality of network interface units 210, 220, 230, and 240 and at least one master unit 250 connected to the plurality of network interface units. For example, the network interface units 210, 220, 230, and 240 may be implemented as PCI-Express type interfaced network interface cards which may be mounted in slots of a single board, and the master unit may be implemented including a main CPU 255 (for example, x86 CPU).

As an example, the network duplexing apparatus according to an embodiment may include four network interface units 210, 220, 230, and 240 respectively having a network interface (for example, SFP+ interface; 10 Gigabit Ethernet; 211, 221, 231, and 241), and a single master unit 250 including the CPU 255 connected to the network interface units. Instead of implementing the master unit in the form of a separate card, implementing main functions of the master unit by using the CPU can decrease cost for implementing. Thus, the network interface units and the master unit may be configured in a single server board.

However, the master unit does not need to include the network interface unlike the network interface units.

The network interface units and the master unit may be configured in such a manner that communication between the network interface units and the master unit may be performed through predetermined high-speed interfaces 261, 262, 263, and 264. In this instance, the network interface units and the master unit may perform communication therebetween through an interface bus of slots in which the units are mounted.

The network interface units in the network duplexing apparatus according to an embodiment of the present invention is responsible for transmission and reception of a traffic packet with the outside, and analyzes packets transmitted and received through the network interface units to store and manage information of flows passing through the network interface units and traffic information of the flows. However, when the flow passing through the network interface units corresponds to an asymmetric flow, each of the network interface units does not have information about an opposite side flow constituting the asymmetric flow. Thus, information about the asymmetric flow may be integrally managed by the master unit.

Figure 3:
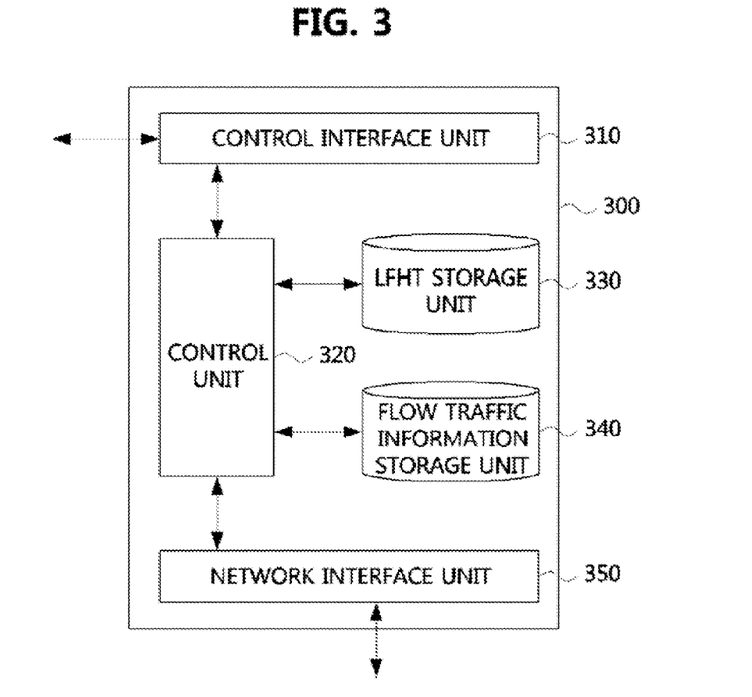
FIG. 3 is a block diagram illustrating a configuration example of a network interface unit of a network duplexing apparatus according to an embodiment of the present invention.

FIG. 3 is a block diagram illustrating a configuration example of a network interface unit of a network duplexing apparatus according to an embodiment of the present invention.

Referring to FIG. 3, a configuration example 300 of the network interface unit of the network duplexing apparatus according to an embodiment of the present invention may include a control interface unit 310, a control unit 320, a local flow header table (LFHT) storage unit 330, a flow traffic information storage unit 340, and a network interface unit 350.

First, the control interface unit 310 is a component for performing interfacing with the above-described master unit. As an embodiment, the control interface unit may be connected to the master unit in a PCI-express interface method. The master unit may also include a control interface unit 410 corresponding to the control interface unit 310, and a configuration of the master unit will be described later.

The network interface unit 350 is a component for processing a high-speed network interface such as SFP+ interface (10 Gigabit Ethernet), and performs a function of a typical NIC.

Meanwhile, the control unit 320, the LFHT storage unit 330, and the flow traffic information storage unit 340 correspond to key components of the network interface unit for performing operations of the network duplexing apparatus according to an embodiment of the present invention.

The LFHT storage unit 330 is a component for storing an LFHT, and records information about a flow passing through each of the network interface units. The flows whose information is recorded in the LFHT may be both side flows constituting a symmetric flow and one side flows constituting an asymmetric flow.

The flow traffic information storage unit 340 is a component for storing traffic information of the flows stored in the LFHT storage unit. Here, the traffic information of the flow may include, for example, the number of packets of a corresponding flow, a total amount of data, a transmission speed, the number of hops, and the like. According to an embodiment, the flow traffic information storage unit 330 and the LFHT storage unit 340 may be integrally configured.

The control unit 320 analyzes a traffic packet flowing into the network interface unit 350, generates information of a first flow corresponding to the traffic packet when the information of the first flow is not generated in the LFHT, and stores the generated information in the LFHT.

In addition, when recognizing that an opposite side flow (hereinafter, referred to as a "second flow") of the first flow is processed in another network interface unit rather than the corresponding network interface unit (that is, when recognizing that the first flow is included in an asymmetric flow), the control unit 320 provides the information of the first flow to the master unit 250 through the control interface unit 310. In addition, the control unit 320 may request and receive, from the master unit, information of the second flow that is the opposite side flow of the first flow.

In this instance, a method in which the control unit 320 recognizes that the opposite side flow (second flow) of the first flow is processed in another network interface unit may be configured differently depending on cases of a flow in accordance with a connection-oriented protocol and a flow in accordance with a connectionless-oriented protocol.

The above-described control unit 320, LFHT storage unit 330, and flow traffic information storage unit 340 will be described later with reference to examples of specific operations.

Figure 4:
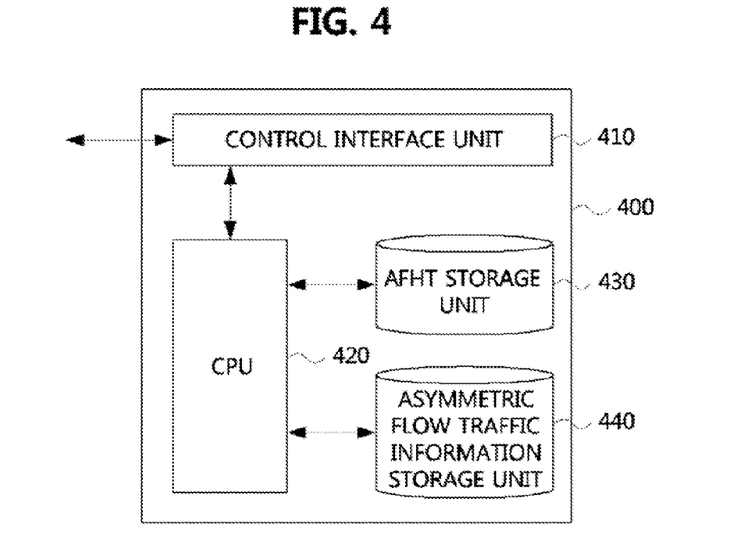
FIG. 4 is a block diagram illustrating a configuration example of a master unit of a network duplexing apparatus according to an embodiment of the present invention.

FIG. 4 is a block diagram illustrating a configuration example of a master unit of a network duplexing apparatus according to an embodiment of the present invention.

Referring to FIG. 4, a configuration example 400 of the master unit of the network duplexing apparatus according to an embodiment of the present invention may include a control interface unit 410, a central processing unit 420, an asymmetric flow header table (AFHT) storage unit 430, and an asymmetric flow traffic information storage unit 440.

First, the control interface unit 410 is a component for performing interfacing with the above-described network interface units. As an embodiment, the control interface unit 410 may be connected to the above-described network interface units in a PCI-express interface method. For example, the control interface unit 410 of the master unit may be configured with a PCI-express master, and the control interface unit 310 of the network interface unit may correspond to a PCI-express slave.

Meanwhile, the central processing unit 420, the AFHT storage unit 430, and the asymmetric flow traffic information storage unit 440 correspond to key components of the master unit for performing operations of the network duplexing apparatus according to an embodiment of the present invention.

The AFHT storage unit 430 is a component for storing an AFHT, and stores information of asymmetric flows. That is, symmetric flows included in the corresponding network interface units and one side flows of the asymmetric flow passing through the corresponding network interface units are recorded in the LFHT of the network interface units, whereas information of all asymmetric flows processed by the network interface units is integrally recorded in the AFHT.

The asymmetric flow traffic information storage unit 440 is a component for storing traffic information of the asymmetric flows stored in the AFHT storage unit 430. Here, the traffic information of the asymmetric flow may include, for example, the number of packets of the corresponding asymmetric flow, a total amount of data, a transmission speed, the number of hops, and the like. The traffic information of the asymmetric flow may be collected from the network interface units which process the one side flow constituting the corresponding asymmetric flow.

According to an embodiment, the asymmetric flow traffic information storage unit 440 and the AFHT storage unit 430 may be integrally configured. The asymmetric flow traffic information storage unit 440 and the AFHT storage unit 430 may be implemented using various storage device—a volatile memory such as RAM or using a non-volatile memory such as FLASH memory, Hard Disk Drive, etc.

The central processing unit 420 receives information about the asymmetric flow from the network interface unit to store the received information in the AFHT, and returns, when information of an opposite side flow of the one side flow included in the asymmetric flow received from the network interface unit has been already stored in the AFHT, the information of the opposite side flow to the network interface unit. That is, the central processing unit 420 may execute program codes written in order to perform the above described operations.

The above-described control unit 420, the AFHT storage unit 430, and the asymmetric flow traffic information storage unit 440 will be described later with reference to examples of specific operations.

Network Duplexing Method for Asymmetric Flow Management

Hereinafter, operations of the network duplexing apparatus according to an embodiment of the present invention will be described respectively in cases of a connection-oriented protocol and a connectionless-oriented protocol. The connection-oriented protocol may include a transfer control protocol (TCP), and the connectionless-oriented protocol may include, for example, a user datagram protocol (UDP) or an Internet control message protocol (ICMP) as a non-TCP protocol.

1) Operation Method Corresponding to Connection-Oriented Protocol

Figure 5:
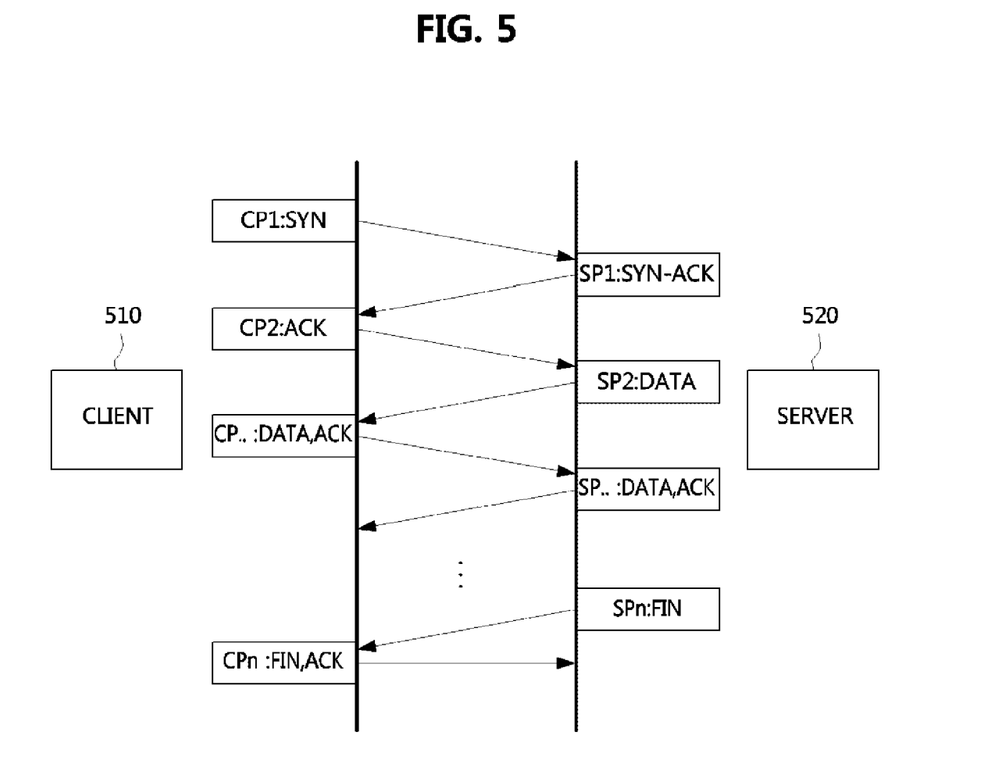
FIG. 5 is a conceptual diagram illustrating an example of packet transmission between a client and a server in accordance with a TCP protocol in order to describe an operation of a connection-oriented protocol of a network duplexing apparatus according to an embodiment of the present invention.
Figure 6:
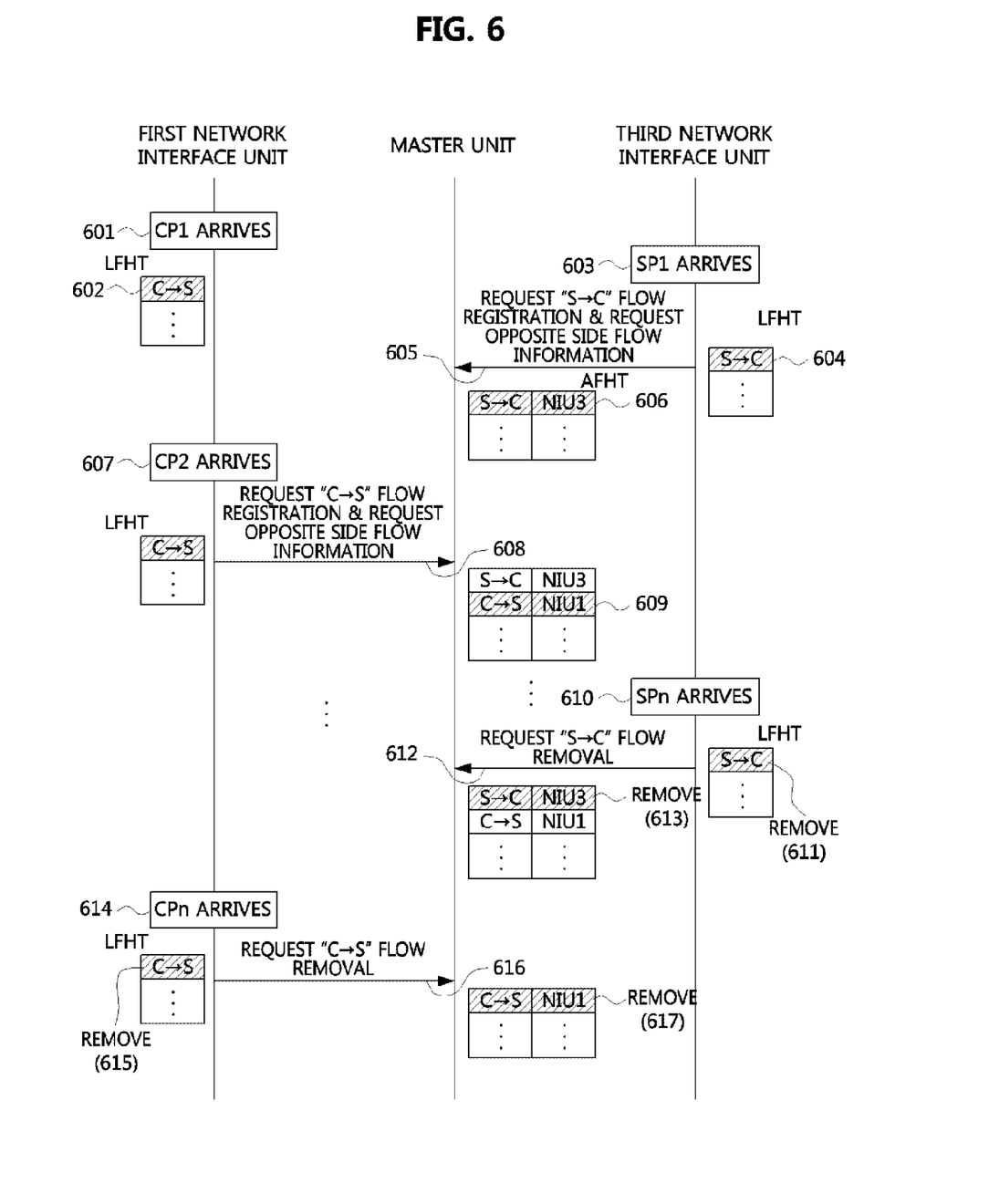
FIG. 6 is a message flowchart illustrating operational procedures of a connection-oriented protocol between components of a network duplexing apparatus according to an embodiment of the present invention.

FIG. 5 is a conceptual diagram illustrating an example of packet transmission between a client and a server in accordance with a TCP protocol in order to describe an operation of a connection-oriented protocol of a network duplexing apparatus according to an embodiment of the present invention, and FIG. 6 is a message flowchart illustrating operational procedures of a connection-oriented protocol between components of a network duplexing apparatus according to an embodiment of the present invention.

First, referring to FIG. 5, a case in which a client 510 side transmits a synchronization (SYN) packet (CP1) to a server 520 side to request generation of a TCP flow, and the server 520 responds to the generation of the TCP flow is shown. Obviously, a case in which the server side transmits the SYN packet to the client side to request the generation of the TCP flow may be possible.

In the TCP protocol, the other side (for example, server) transmits an SYN-ACK packet with respect to the SYN packet transmitted by one side (for example, client), and the one side that has transmitted the SYN packet transmits an ACK packet with respect to the SYN-ACK packet again, and therefore two flows such as a flow from the client to the server and a flow from the server to the client may be generated.

In the following descriptions, packets transmitted from the client side to the server side may be displayed as CP#n, and packets transmitted from the server side to the client side may be displayed as SP#n. Here, #n corresponds to expression for designating orders of the packets.

In this instance, it should be noted that the "client" and the "server" are merely terms exemplarily used for distinguishing subjects of packet transmission and reception and do not define roles of the client and the server in the strict sense, and roles of operations which will be described later are not limited to the client and the server. For example, in the following descriptions, the client and the server may be named as a first device (terminal) and a second device (terminal), respectively.

Hereinafter, operational procedures of the network duplexing apparatus according to an embodiment of the present invention will be described with reference to FIGS. 5 and 6.

In the following example, a case in which an asymmetric flow is generated, that is, a case in which a flow from a client to a server (hereinafter, referred to as client flow or "C→S" flow) is processed through a first network interface unit but a flow from the server to the client (hereinafter, referred to as server flow or "S→C" flow) is processed through a third network interface unit will be assumed and described.

When a client packet 1 (CP1) first arrives at the first network interface unit 210 in operation 601, the first network interface unit 210 searches its own LFHT, determines that a flow corresponding to the CP1 is not generated yet, and newly adds a client flow 602 to the LFHT. That is, in this instance, information indicating that a flow transmitted from the client to the server is processed through the first network interface unit is stored in the LFHT of the first network interface unit. For example, information of the flow is stored in the LFHT in such a manner as to be expressed as "C→S" (In FIG. 6, the shade of the LFHT is used for indicating an item that is currently processed on the LFHT).

In this instance, since the CP1 is an SYN packet, the first network interface unit cannot recognize yet whether an SYN-ACK packet (that is, traffic from server to client; SP1 which will be described later) corresponding to the SYN packet is transmitted through the first network interface unit, or transmitted through another network interface unit rather than the first network interface unit. Thus, the first network interface unit generates only a flow corresponding to the CP1 in the LFHT of the first network interface unit, and does not create a separate request to the master unit 250.

Next, when a server packet (SP1) first arrives at the third network interface unit 230 in operation 603, the third network interface unit 230 searches its own LFHT, determines that a flow corresponding to the SP1 is not generated yet, and then newly adds a server flow 604 to the LFHT. That is, in the LFHT of the third network interface unit, information indicating that the flow transmitted from the server to the client is processed through the third network interface unit is stored. For example, information of the flow is stored in the LFHT in such a manner as to be expressed as "S→C".

In this instance, the control unit of the third network interface unit requests, from the master unit, registration of the "S→C" flow as the asymmetric flow through the control interface unit. The third network interface unit recognizes that the SP1 is an SYN-ACK packet (recognizes indicator of packet header) but an SYN packet corresponding to the SYN-ACK packet has not been processed in the third network interface unit (there is no information of "C→S" flow on LFHT), and therefore it can be recognized that the SP1 packet corresponds to the asymmetric flow.

The master unit 250 adds, to an AFHT, server flow ("S→C") information transmitted from the third network interface unit 230 in operation 606, and transmits the result to the control unit of the third network interface unit 230. In this instance, the master unit also stores, in the AFHT, information indicating that the corresponding flow ("S→C") is processed in the third network interface unit. For example, in the AFHT of the master unit, the fact that the flow ("S→C") from the server to the client is processed in the third network interface unit (NIU3) is recorded (In FIG. 6, the shade of AFHT is used for indicating an item that is currently processed on AFHT).

In this instance, when an opposite side flow ("C→S") has been already recorded in the AFHT, the master unit may notify the fact that the opposite side flow has been already stored in the AFHT of the master unit to the third network interface unit. In examples of FIGS. 5 and 6, since the opposite side flow ("C→S") is not generated yet in the AFHT of the master unit at this point, the master unit may notify the fact that the opposite side flow is not stored in the master unit. Meanwhile, the master unit does not create an explicit response to a query on whether a record of the opposite side flow ("C→S") of the third network interface unit exists in the AFHT, and therefore may implicitly notify, to the third network interface unit, the fact that the record of the opposite side flow ("C→S") does not exist in the AFHT.

Next, when a CP2 arrives at the first network interface unit 210 in operation 607, the control unit of the first network interface unit 210 searches its own LFHT to determine whether an opposite side flow ("S→C") exists, recognizes that a flow from the client to the server (client flow) is an asymmetric flow, transmits its own client flow information to the master unit 210 through the control interface unit, and requests opposite side flow ("S→C") information in operation 608. In this instance, since the first network interface unit has already recognized that the previous packet (CP1) is the SYN packet, the first network interface unit may recognize that the "C→S" flow is the asymmetric flow only through the fact that the opposite side flow ("S→C") is not generated in its own LFHT.

The master unit that has received client flow ("C→S") information of the first network interface unit and a search request of the opposite side flow from the first network interface unit adds the requested client flow information in the AFHT in operation 609, and transmits the result to a corresponding AFA 221 when the opposite side SF exists. In this instance, the master unit records, in the AFHT, the fact that the first network interface unit processes the client flow ("C→S") in operation 609.

Through the above-described procedures, the first network interface unit may recognize that the client flow ("C→S") that is currently processed by the first network interface unit corresponds to the asymmetric flow, and the third network interface unit may also recognize that the server flow ("S→C") that is currently processed by the third network interface unit corresponds to the asymmetric flow.

Thus, in the following procedures, the first network interface unit may continuously update and store traffic information (for example, the number of packets, a total amount of data, a transmission speed, the number of hops, and the like) of its own flow ("C→S"), and the third network interface unit may continuously update and store traffic information of its own flow ("S→C").

In addition, at a point of time when packets included in each flow are transmitted and received, the first and third network interface units may transmit the updated traffic information to the master unit. Alternatively, the first and third network interface units may transmit the traffic information of each flow to the master unit at predetermined intervals. The master unit stores the traffic information of the asymmetric flow received from each of the network interface units in the asymmetric flow traffic information storage unit 440.

In this instance, the predetermined intervals may be predetermined time intervals. Alternatively, at a point of time when a predetermined event condition is satisfied, the first and third network interface units may transmit the traffic information of each flow to the master unit.

In this instance, the first and third network interface units may only autonomously maintain traffic information about flows which are not the asymmetric flow without providing the traffic information to the master unit. By the above-described method, the first and third network interface units may determine whether the flows passing through the first and third network interface units are flows included in the symmetric flow or the asymmetric flow, and therefore the first and third network interface units may only autonomously store the traffic information about the symmetric flow without providing the traffic information to the master unit.

This may create an effect of reducing a communication bandwidth burden between the master unit and the network interface units. Meanwhile, the master unit may integrally manage information about the asymmetric flows of the network duplexing apparatus including the master unit. The master unit may provide the asymmetric flow information managed by a request from the outside (user/manager), thereby enabling integral management.

Meanwhile, hereinafter, a procedure for processing flow completion in the network duplexing apparatus according to an embodiment of the present invention will be described.

When an SPn (Fin packet) arrives at the third network interface unit in operation 610, the third network interface unit removes a server flow ("S→C") from its own LFHT in operation 611, and requests completion of the server flow from the master unit in operation 612. When receiving the completion request from the third network interface unit, the master unit removes the server flow from the AFHT in operation 613, and returns the result to the third network interface unit.

When a CPn (Fin packet) arrives at the first network interface unit in operation 614, the first network interface unit removes a client flow ("C→S") from its own LFHT in operation 615, and requests completion of the client flow from the master unit in operation 616. When receiving the completion request of the client flow from the first network interface unit, the master unit removes the client flow from the AFHT in operation 617, and returns the result to the first network interface unit.

Consequently, by the requests of the first network interface unit and the third network interface unit, the information about the asymmetric flow may be all removed from the AFHT of the master unit.

2) Operation Method of Connectionless-Oriented Protocol

Figure 7:
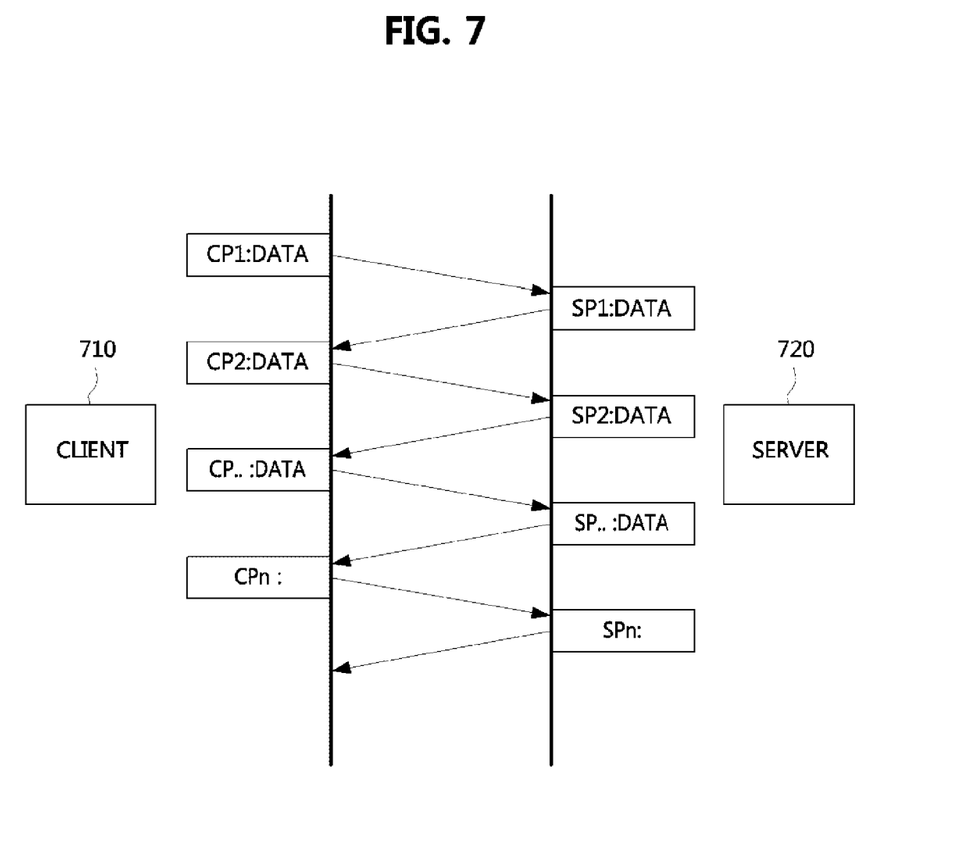
FIG. 7 is a conceptual diagram illustrating an example of packet transmission between a client and a server in accordance with a non-TCP protocol in order to describe operations of a connectionless-oriented protocol of a network duplexing apparatus according to an embodiment of the present invention.
Figure 8:
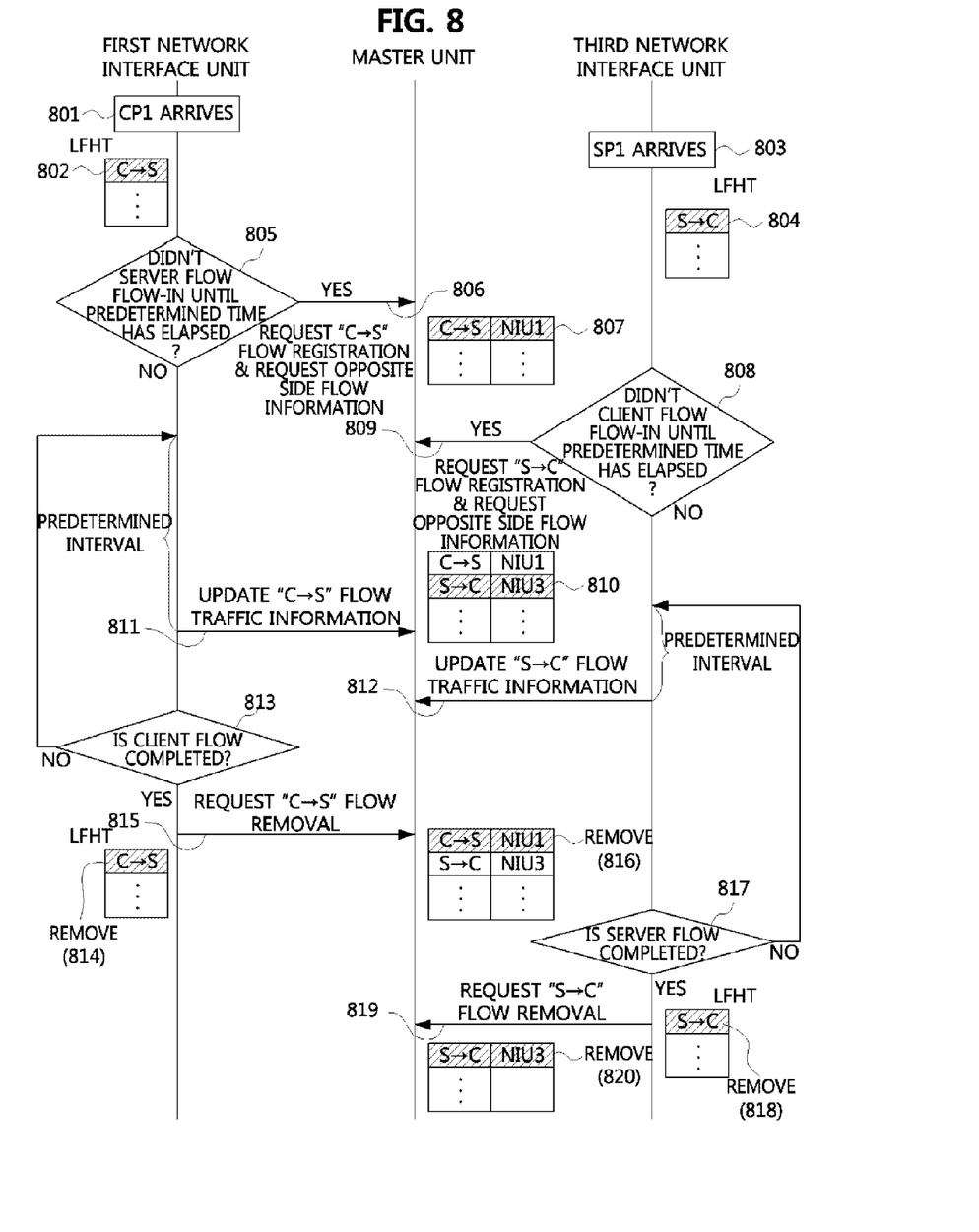
FIG. 8 is a message flowchart illustrating operational procedures of a connectionless-oriented protocol between components of a network duplexing apparatus according to an embodiment of the present invention.

FIG. 7 is a conceptual diagram illustrating an example of packet transmission between a client and a server in accordance with a non-TCP protocol in order to describe operations of a connectionless-oriented protocol of a network duplexing apparatus according to an embodiment of the present invention, and FIG. 8 is a message flowchart illustrating operational procedures of a connectionless-oriented protocol between components of a network duplexing apparatus according to an embodiment of the present invention.

First, referring to FIG. 7, a case in which a client 710 and a server 720 mutually transmit and receive data in accordance with a connectionless-oriented protocol is shown.

In case of the above-described connection-oriented protocol (for example, TCP protocol), an explicit flow generation procedure by transmission and reception of SYN, SYN-ACK, and ACK packets between one side and the other side may exist, but in the connectionless-oriented protocol, a flow may be implicitly generated by transmission and reception of data packets without such a process, and the flow may be implicitly released when exchange of data packets is not performed for a prescribed period.

In the following descriptions, like the above-described connection-oriented embodiment, packets transmitted from the client side to the server side are displayed as CP#n, and packets transmitted from the server side to the client side are displayed as SP#n. Here, #n corresponds to expression for designating orders of the packets.

Hereinafter, operational procedures of the network duplexing apparatus according to an embodiment of the present invention will be described with reference to FIGS. 7 and 8.

In the following example, a case in which an asymmetric flow is generated, that is, a case in which a flow from a client to a server (hereinafter, referred to as client flow or "C→S" flow) is processed through a first network interface unit but a flow from the server to the client (hereinafter, referred to as server flow or "S→C" flow) is processed through a third network interface unit will be assumed and described.

When a client packet 1 (CP1) first arrives at the first network interface unit in operation 801, the first network interface unit searches its own LFHT, determines that flow information corresponding to the CP1 is not generated yet, and then newly adds a client flow ("C→S") to the LFHT in operation 802. In this instance, since the first network interface unit cannot determine whether an opposite side flow (that is, server flow) of the flow (client flow) corresponding to the CP1 flows in the first network interface unit, the first network interface unit adds only the client flow to its own LFHT.

When a server packet (SP1) first arrives at the third network interface unit in operation 803, the third network interface unit searches its own LFHT, determines that flow information corresponding to the SP1 is not generated yet, and then newly adds a server flow ("S→C") to the LFHT in operation 804. In this case, since the third network interface unit cannot ascertain yet the fact that an opposite side flow (that is, client flow) of the flow (server flow) corresponding to the SP1 passes through the first network interface unit, the third network interface unit adds only the server flow to its own LFHT.

Unlike the above-described connection-oriented protocol, in case of the connectionless-oriented protocol, a packet indicator for defining a packet exchange procedure such as SYN packets or SYN-ACK packets does not exist, and therefore even in case of the third network interface unit, whether the server flow corresponds to the asymmetric flow may not be determined only through the fact that the SP1 is transmitted to the third network interface unit.

Thus, when traffic packets included in the opposite side flow (that is, server flow) do not flow into the first network interface unit in operation 805 during transmission and reception of a predetermined minimum number of packets (for example, basically three packets) through the first network interface unit after the CP1 or for a predetermined timeout period (for example, basically one second), the first network interface unit requests registration of the client flow as the asymmetric flow from the master unit, and requests information about the opposite side flow (server flow).

The master unit adds the client flow information transmitted from the first network interface unit to the AFHT in operation 807, and transmits the result to the control unit of the first network interface unit. In this instance, the master unit returns information of the opposite side flow (server flow) to the first network interface unit when the information of the opposite side flow (server flow) has already existed in the AFHT.

When the master unit notifies the presence of the opposite side flow to the first network interface unit in a case in which the opposite side flow has already existed, the first network interface unit may explicitly recognize that the client flow corresponds to the asymmetric flow. However, in the example of FIG. 8, since the server flow is not yet recorded in the AFHT, the master unit may explicitly notify, to the first network interface unit, that the opposite side flow (server flow) is not yet recorded in the AFHT, or implicitly notify, to the first network interface unit, that the opposite side flow (server flow) is not yet recorded in the AFHT by preventing a separate response from being transmitted.

In addition, when packets included in the opposite side flow (that is, client flow) do not flow in the third network interface unit in operation 808 during transmission and reception of a predetermined minimum number of packets (for example, basically three packets) through the third network interface unit after the SP1 or for a predetermined timeout period (for example, one second), the third network interface unit requests registration of the server flow ("S→C") in the AFHT from the master unit in operation 809, and requests information about the opposite side flow ("C→S") in operation 809.

The master unit adds the server flow information transmitted from the third network interface unit to the AFHT in operation 810, and transmits the result to the control unit of the third network interface unit. In this instance, when the information of the opposite side flow (client flow) has already existed in the AFHT, the master unit returns the information of the opposite side flow to the third network interface unit.

When the master unit notifies, to the third network interface unit, the fact that the opposite side flow exists in a case in which the opposite side flow has already existed, the third network interface unit may explicitly recognize that the server flow corresponds to the asymmetric flow. In the example of FIG. 8, since the client flow ("C→S") is recorded in the AFHT at this point, the master unit may explicitly notify, to the third network interface unit, the fact that the opposite side flow (client flow) is recorded in the AFHT. Thus, the third network interface unit may explicitly recognize that the server flow of the third network interface unit corresponds to the asymmetric flow.

When the opposite side flow (server flow) does not flow in the first network interface unit thereafter, the control unit of the first network interface unit transmits updated traffic information of the flow to the master unit whenever a predetermined number of packets (for example, basically 10 packets) is processed until the maximum number of packets (for example, basically 100 packets) is obtained (for example, in operation 811), and transmits a request message with respect to the opposite side flow information. The master unit adds the client flow traffic information transmitted from the first network interface unit in the asymmetric flow traffic information storage unit, and transmits the result to the control unit of the first network interface unit. In this instance, when the opposite side flow exists, the master unit also returns the information about the opposite side flow.

In the same manner, when the opposite side flow (client flow) does not continuously flow in the third network interface unit thereafter, the control unit of the third network interface unit transmits updated traffic information of the flow to the master unit whenever a predetermined number of packets (for example, basically 10 packets) is processed until the maximum number of packets (for example, basically 100 packets) is obtained (for example, in operation 812), and transmits a request message with respect to the opposite side flow. The master unit adds the server flow traffic information transmitted from the third network interface unit in the asymmetric flow traffic information storage unit, and transmits the result to the control unit of the third network interface unit. In this instance, when the opposite side flow exists, the master unit also returns the information about the opposite side flow.

That is, when the opposite side flow of the flow which has been already ascertained does not appear in the first network interface unit and the third network interface unit, the first and third network interface units may assume the corresponding flow to be the asymmetric flow, and transmit traffic information of the flow to the master unit at predetermined intervals. In addition, the first network interface unit and the third network interface unit may receive the information about the opposite side flow from the master unit at any time, and explicitly recognize that flows of the first and third network interface units correspond to the asymmetric flow when the opposite side flow exists in another network interface unit which is not the first or third network interface unit.

Meanwhile, in case of the connectionless-oriented protocol, completion of the flow may be implicitly determined from the fact that the packets included in the flow currently processed by each of the network interface units do not flow in the corresponding network interface units for a prescribed period unlike the connection-oriented protocol. For example, when packets included in the flow (client flow) of the first network interface unit do not flow in for a prescribed period, the first network interface unit determines that the client flow is completed. In the same manner, when packets included in the flow (server flow) of the third network interface unit do not flow in for a prescribed period, the third network interface unit determines that the server flow is completed. Hereinafter, procedures of cases in which the first and third network interface units recognize that the flows of the first and third network interface units are completed will be described.

First, when recognizing that the client flow is completed in operation 813, the first network interface unit removes client flow information from its own LFHT in operation 814, and notifies, to the master unit, that the client flow is completed in operation 815. When receiving notification of completion of the client flow from the first network interface unit, the master unit removes the information of the client flow from the AFHT in operation 816, and returns the result.

As the same procedure, when recognizing the server flow is completed in operation 817, the third network interface unit removes server flow information from its own LFHT in operation 818, and notifies, to the master unit, that the server flow is completed in operation 819. When receiving notification of completion of the server flow from the third network interface unit, the master unit removes the information of the server flow from the AFHT in operation 820, and returns the result.

Consequently, the information about the asymmetric flow is all removed from the AFHT of the master unit by the requests of the first and third network interface units.

When comparing the connection-oriented embodiment and the connectionless-oriented embodiment, in case of the connection-oriented embodiment, an explicit flow generation procedure by an SYN/SYN-ACK/ACK message exists, and therefore the network interface units may relatively early ascertain whether flows processed by the network interface units correspond to the asymmetric flow or the symmetric flow. In addition, in case of the connection-oriented embodiment, an explicit flow releasing procedure by an FIN message exists, and therefore the network interface units may relatively early ascertain whether the flows processed by the network interface units are released, and notify the result to the master unit.

On the other hand, in case of the connectionless-oriented embodiment, an explicit flow generation procedure does not exist, and therefore each of the network interface units may determine the corresponding flow to be the asymmetric flow when the opposite side flow does not flow in each of the network interface units until a predetermined number of packets is processed or a predetermined timer value is completed.

However, even in the connectionless-oriented embodiment, an NIC1 and an NIC3 may only autonomously maintain traffic information about the flows which are not the asymmetric flow and does not provide the traffic information to the master unit, like the case of the connection-oriented protocol. By the above-described method, the NIC1 and the NIC3 may ascertain whether the flows passing through the NIC1 and the NIC3 correspond to the asymmetric flow, and therefore only autonomously maintain traffic information about the symmetric flow and does not provide the traffic information to the master unit. This may create an effect of reducing a communication bandwidth burden between the master unit and the network interface units. Meanwhile, the master unit may integrally manage the information about the asymmetric flows of the network duplexing apparatus including the master unit. The master unit may provide the managed asymmetric flow information by a request from the outside (user/manager), thereby enabling integral management.

In general, network equipment may perform flow-based analysis distributed through reflection of a flow table, only with respect to the traffic flowing into the corresponding interface. In this case, in a duplexed network environment or a network environment using a multi-path, flow-based analysis may not be accurately provided.

When applying a clustering method proposed in the present invention with respect to the asymmetric flow, the asymmetric flows may be integrally managed with respect to multiple paths associated with in-out, and traffic information of the asymmetric flows may be also managed in real-time.

Thus, according to the present invention, traffic analysis such as flow-based deep packet inspection may be possible, and flow-based application recognition and control may be possible through the traffic analysis.

While example embodiments of the present invention and their advantages have been described in detail, it should be understood that various changes, substitutions, and alterations may be made herein without departing from the scope of the invention.

What is claimed is:

1. A network duplexing apparatus comprising:
a plurality of network interface units, each of which is configured to generate and store information of a flow flowing in a network interface unit when the information of the flow is not generated, and, when the flow corresponds to an asymmetric flow, provide the information of the flow to a master unit and request information of an opposite side flow of the flow from the master unit to receive the requested information; and
the master unit communicating with the plurality of network interface units and configured to store the information of the flow provided from a first network interface unit among the plurality of network interface units, determine whether the information of the opposite side flow provided from a second network interface unit among the plurality of network interface units is stored, and provide the information of the opposite side flow to the first network interface unit when the information of the opposite side flow is stored,
wherein the plurality of network interface units are network interface cards equipped in each corresponding slot of a board, and the master unit comprises a central processing unit (CPU), and
wherein the asymmetric flow is performed through the first and second network interface units.

2. The network duplexing apparatus of claim 1, wherein the network duplexing apparatus is operated based on a connection-oriented protocol.

3. The network duplexing apparatus of claim 2, wherein, when information of a flow including an SYN packet corresponding to an SYN-ACK packet is not stored in a network interface unit in a case in which the SYN-ACK packet flows in, the network interface unit recognizes that the flow corresponds to the asymmetric flow.

4. The network duplexing apparatus of claim 2, wherein, when information of a flow including an SYN-ACK packet is not stored in a network interface unit in a case in which an ACK packet with respect to the SYN-ACK packet flows in, the network interface unit recognizes that the flow corresponds to the asymmetric flow.

5. The network duplexing apparatus of claim 1, wherein the network duplexing apparatus is operated based on a connectionless-oriented protocol.

6. The network duplexing apparatus of claim 5, wherein, when the opposite side flow does not flow in the first network interface unit for a prescribed period, the first network interface unit recognizes that the flow corresponds to the asymmetric flow.

7. The network duplexing apparatus of claim 1, wherein the first and second network interface units provide traffic information of flows corresponding to the asymmetric flow to the master unit at a traffic processing point of time of the flows corresponding to the asymmetric flow or at predetermined intervals.

8. The network duplexing apparatus of claim 7, wherein the master unit stores the traffic information of the flows corresponding to the asymmetric flow provided from the first and second network interface units.

9. The network duplexing apparatus of claim 1, wherein each of the network interface units includes:
   a control interface unit configured to perform interfacing with the master unit;
   a network interface unit configured to transmit and receive the flow to and from the outside;
   a local flow header table storage unit configured to store information about flows processed in the network interface unit;
   a traffic information storage unit configured to store traffic information of the flows; and
   a control unit configured to analyze a packet flowing in through the network interface unit, generate information of a flow corresponding to the packet when the information of the flow corresponding to the packet is not generated, store the generated information in the local flow header table storage unit, provide the information of the flow to the master unit through the control interface unit when the flow corresponds to the asymmetric flow, request the information of the opposite side flow of the flow from the master unit to receive the requested information, and store the traffic information of the flow in the traffic information storage unit.

10. The network duplexing apparatus of claim 1, wherein the master unit includes:
    a control interface unit configured to perform interfacing with the network interface units;
    an asymmetric flow header table storage unit configured to store information of the asymmetric flow received from the network interface units;
    a traffic information storage unit configured to store traffic information of the asymmetric flow; and
    a central processing unit (CPU) configured to determine whether the information of the opposite side flow is stored with reference to the information of the asymmetric flow through the control interface unit, provide the information of the opposite side flow to the first network interface unit when the information of the opposite side flow is stored, and store the information of the flow.

11. A network duplexing method as an operation method of a network duplexing apparatus including a master unit and a plurality of network interface units including first and second interface units, the network duplexing method comprising:
    analyzing, by the first network interface unit, a flow flowing in the first network interface unit;
    generating and storing, by the first network interface unit, information of the flow when the information of the flow is not generated;
    determining, by the first network interface unit, whether the flow corresponds to an asymmetric flow, providing the information of the flow to the master unit when the flow is determined to correspond to the asymmetric flow, and requesting information of an opposite side flow of the flow from the master unit to receive the requested information;
    storing, by the master unit, the information of the flow provided from the first network interface unit; and
    determining, by the master unit, whether the information of the opposite side flow from the second network interface unit is stored, and providing the information of the opposite side flow to the first network interface unit when the information of the opposite side flow is stored,
    wherein the plurality of network interface units are network interface cards equipped in each corresponding slot of a board, and the master unit comprises a central processing unit (CPU), and
    wherein the asymmetric flow is performed through the first and second network interface units.

12. The network duplexing method of claim 11, wherein the flow is a flow in accordance with a connection-oriented protocol.

13. The network duplexing method of claim 12, wherein, when information of a flow including an SYN packet corresponding to an SYN-ACK packet is not stored in a network interface unit in a case in which the SYN-ACK packet flows in, the network interface unit recognizes that the flow corresponds to the asymmetric flow.

14. The network duplexing method of claim 12, wherein, when information of a flow including an SYN-ACK packet is not stored in a network interface unit in a case in which an ACK packet with respect to the SYN-ACK packet flows in, the network interface unit recognizes that the flow corresponds to the asymmetric flow.

15. The network duplexing method of claim 11, wherein the flow is a flow in accordance with a connectionless-oriented protocol.

16. The network duplexing method of claim 15, wherein, when the opposite side flow of the flow does not flow in the first network interface unit for a prescribed period, the first network interface unit recognizes that the flow corresponds to the asymmetric flow.

17. The network duplexing method of claim 11, further comprising providing, by the first and second network interface units, traffic information of flows corresponding to the asymmetric flow to the master unit at a traffic processing point of time of the flows corresponding to the asymmetric flow or at predetermined intervals.

18. The network duplexing method of claim 17, further comprising storing, by the master unit, the traffic information of the flows corresponding to the asymmetric flow provided from the first and second network interface units.

* * * * *